United States Patent [19]
Risch

[11] 3,743,934
[45] July 3, 1973

[54] APPARATUS FOR MONITORING THE AIR GAP IN ROTARY ELECTRICAL MACHINES USING MAGNETIC FIELD PLATES OR MAGNETO DIODES

[75] Inventor: Rudolf Risch, Baden, Switzerland

[73] Assignee: Brown, Boveri & Company Limited, Baden, Switzerland

[22] Filed: May 6, 1971

[21] Appl. No.: 140,928

[30] Foreign Application Priority Data
May 20, 1970 Switzerland.......................... 7512/70

[52] U.S. Cl. ................................ 324/34 E, 73/462
[51] Int. Cl............................................ G01r 33/00
[58] Field of Search...................... 324/34 R, 34 PS, 324/34 E, 34 D, 158 MG; 340/282; 318/490; 73/462, 71.4; 323/94 H; 338/32 R, 32 H

[56] References Cited
UNITED STATES PATENTS

| | | | |
|---|---|---|---|
| 2,204,425 | 6/1940 | Mershon | 324/340 |
| 2,879,470 | 3/1959 | Wright, Jr. | 73/462 X |
| 2,924,759 | 2/1960 | Maaz | 324/45 X |
| 2,997,648 | 8/1961 | Bozorth | 338/32 R X |

FOREIGN PATENTS OR APPLICATIONS

| | | | |
|---|---|---|---|
| 1,089,882 | 9/1960 | Germany | 324/43 |
| 1,226,200 | 10/1966 | Germany | 324/34 R |
| 1,148,064 | 4/1969 | Great Britain | 324/34 PS |

OTHER PUBLICATIONS

Swami et al., Solid State Diode Magnetic Fluxmeter, Int. J. Electronics; Vol. 29, No. 2, pp. 157-160, Mar. 1970

Primary Examiner—Robert J. Corcoran
Attorney—W. G. Fasse

[57] ABSTRACT

The present apparatus monitors the width of an air gap between the rotor and stator of an electrical machine by bridge circuit means which comprise magnetic field responsive probes located in the stator, preferably adjacent to the air gap. Each probe comprises a magnetic field responsive impedance element, such as a Hall-generator, and a temperature responsive ohmic resistance element. The probes are connected in pairs to form said bridge means, whereby monitoring output signals are produced between diagonally opposite bridge terminals, which are evaluated by, for example, a peak voltage rectifier and an indicating instrument.

10 Claims, 4 Drawing Figures

Patented July 3, 1973

INVENTOR.
RUDOLF RISCH

BY

ATTORNEY

Patented July 3, 1973 3,743,934

INVENTOR.
RUDOLF RISCH

BY *W. G. Fasse*

ATTORNEY

APPARATUS FOR MONITORING THE AIR GAP IN ROTARY ELECTRICAL MACHINES USING MAGNETIC FIELD PLATES OR MAGNETO DIODES

BACKGROUND OF THE INVENTION

The invention relates to an apparatus for monitoring the air gap in rotary electrical machines comprising said air gap between the stator and the rotor.

The monitoring of the air gap in rotary electrical machines, for example, in generators and/or motors is rather important for the operating reliability and useful life of such apparatus, since changes in the width of the air gap permit conclusions that the apparatus is subject to normal operation conditions. Causes for the changes in the air gap width result especially from a mass distribution change in the rotor (unbalance) and from magnetic asymmetries.

Devices are known in the art in which air gap changes are measured indirectly, in that conclusions concerning the width of the air gap and instantaneous changes thereof are made on the basis of the oscillatory behaviour of the rotor, for example by measuring the radial displacement of the rotor axis. However, these methods only furnish an acurate picture of the conditions which are present at the end faces of the rotor. Radial displacements of the rotor axis and resulting changes of the air gap width in the interior of the machine cannot be directly measured or detected by means of such known devices. Such displacements may, for example, be due to the elasticity of the rotor shaft.

It is also known to provide auxiliary windings on the machine stator which are galvanically separated or rather insulated from the main winding or windings. Such auxiliary windings generate alternating voltages indiced when the rotor of the machine rotates. Since the r. p. m. of the rotor is known said voltages constitute a measure of the width of the air gap at the location of the auxiliary winding.

A disadvantage of such devices is seen in that these auxiliary windings require additional winding space and hence are not suitable for mounting in an existing stator. A further disadvantage is that such devices provide a signal which depends on the r. p. m. of the rotor.

OBJECTS OF THE INVENTION

In view of the foregoing it is the aim of the invention to achieve the following objects singly or in combination:

to overcome the drawbacks of the prior art;
to provide a means for directly ascertaining or measuring the air gap width and especially the instantaneous air gap width at any point along the entire length of the air gap and also at any time during machine operation;
to provide an apparatus for monitoring the air gap in rotary electrical machines, which permits a direct control;
to provide a monitoring signal which is independent of the rotor r. p. m.;
to provide an electronic circuit member which is especially, but not exclusively, useful for incorporation even in an existing electrical machine without using up winding space, and which member may be conveniently located in the stator as close to the air gap as necessary; and
to provide bridge circuit means especially suitable for use in connection with said circuit member or members.

SUMMARY OF THE INVENTION

According to the invention there is provided a plurality of magnetically sensitive or magnetic field responsive probes or detectors located in the stator of an electrical machine and connected in pairs to form bridge circuit means, the diagonal voltages or bridge voltages of which constitute a direct measure for the width of the monitored air gap.

In a first preferred embodiment of the invention the magnetic field responsive probes extend over a complete pole pitch of the stator. The magnetic field responsive elements of the probes act as transducer and may, for example, comprise magnetic field responsive impedance elements such as magnetic diodes or magnetic field plates.

According to the preferred embodiment, a number of probes corresponding to the number of slots or grooves in the machine are connected in series. This feature has the advantage that local induction variations are averaged so that a mean value is directly ascertained. It is further advantageous to supply the monitoring signal or signals corresponding to the magnitude or width of the air gap to a threshold value responsive indicating or control device the sensitivity of which may be adjustable to different threshold values, whereby even very fine imbalances of the bridge circuit means caused by any air gap changes may be ascertained and utilized, for example, to energize an alarm device.

Depending on the size and overall length of the machine to be monitored, a plurality of the above described air gap monitoring devices may be used for monitoring a single machine, whereby the individual signals may be evaluated in a common indicating and/or alarm device.

SHORT FIGURE DESCRIPTION

In order that the invention may be clearly understood, it will now be described, by way of example, with reference to the accompanying drawings, wherein.

DETAILED DESCRIPTION OF EXAMPLE EMBODIMENTS

Figure 1:
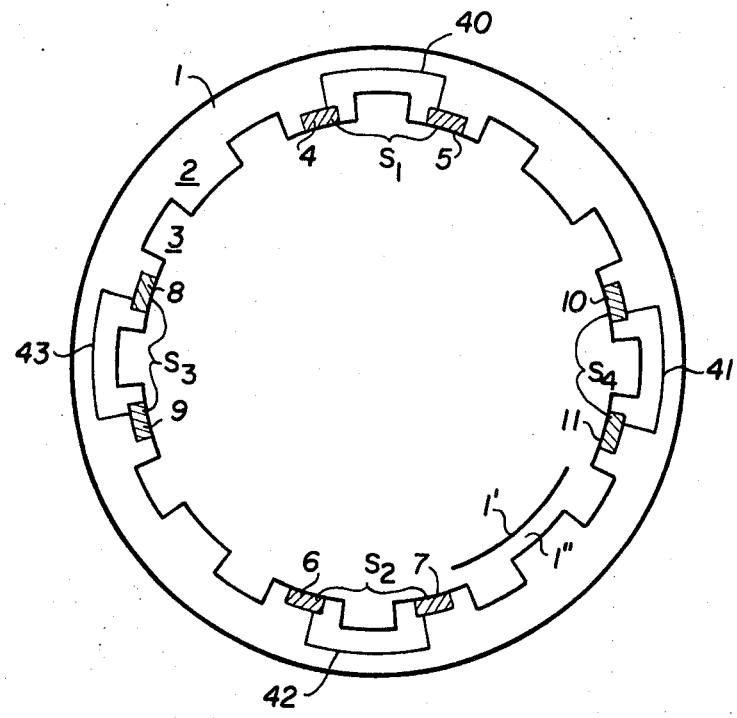
FIG. 1 shows in a diagrammatic fashion a preferred arrangement of the magnetic field responsive probes in the stator of an electrical machine.

In the drawings the same elements are denoted by the same reference numerals. All structural features not directly relevant for understanding the invention have been omitted, also for the sake of clarity and brevity.

In FIG. 1 the stator 1 of an electrical machine surrounds a rotor 1' symbolized by a line. The rotor and stator define an air gap 1 inch of given width which is to be directly monitored. The stator 1 is provided with so called teeth 2 spaced from each other by slots or grooves 3 which receive windings not shown. A plurality of magnetically sensitive or magnetic field responsive pairs of probes S1, .. S4 are mounted in or to the stator 1. In this example two probes each, namely 4 and 5, 6 and 7, 8 and 9, as well as 10 and 11 are connected in series with each other by conductors 40, 41, 42, 43 respectively to form said pairs of probes S1, , , , S4. Each probe is attached to a respective one of said stator teeth 2.

Figure 2:
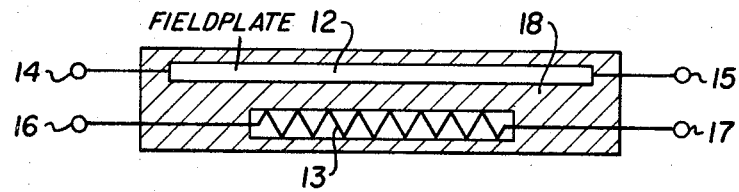
FIG. 2 shows a section through a probe which constitutes an electronic circuit member according to the invention.

One probe constituting an electronic circuit member is shown in section in FIG. 2. The probe comprises a magnetic field responsive impedance element 12 in the form of a magnetic diode or a so called field plate, the ohmic resistance or impedance of which varies depending on the strength of the surrounding magnetic field; and an ohmic, solely temperature responsive resistance element 13 which is galvanically separated or electrically insulated from the field responsive element 12. However, the ohmic resistance element 13 is located close enough to the field responsive element so as to be in intimate thermal contact therewith. The temperature responsive resistance element 13 has a temperature coefficient, corresponding in magnitude to that of the magnetically sensitive impedance element 12, but of opposite sign or sense. Both elements 12 and 13 are surrounded by or embedded in a housing 18 of electrically insulating material which protects these elements from mechanical damage and facilitates the installation thereof. An epoxy resin would be, for example, a suitable insulating material having the mechanical and insulating properties required at temperatures prevailing inside rotary electrical machines.

The connecting leads 14 and 15 of the magnetically sensitive impedance element 12 and the leads 16 and 17 of the ohmic resistance element 13 reach out of the insulating housing 18.

All probes 4, ... 11 (FIG. 1) are constructed as described with reference to FIG. 2. In order to simplify the further description, the following designation will be used. The elements of the probe 4 are identified by the index "4". Accordingly, $12_4$ denotes the magnetically sensitive impedance element of the probe 4, whereas $13_4$ denotes the ohmic resistance element 13 of the probe 4, etc. Respective designations are used in connection with the elements of the probes 5, ... 11.

Figure 3:
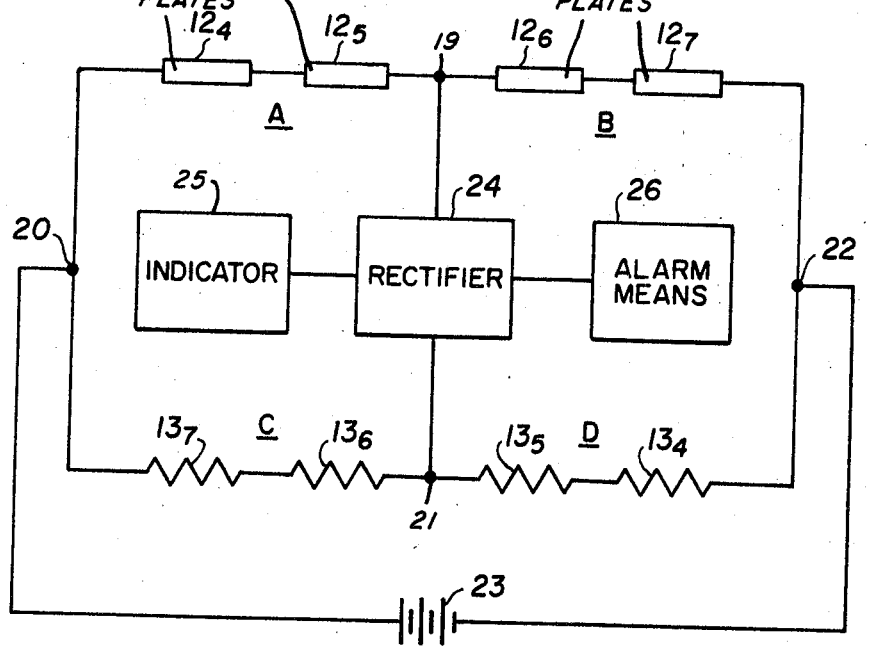
FIG. 3 is a circuit diagram partly in block form illustrating the present bridge circuit means of the invention comprising, for example, two pairs of probes.

Referring to FIG. 3, there is shown a block diagram of bridge circuit means for carrying out the monitoring method of the invention.

The bridge circuit means comprise, for example, two pairs S1 and S2 of probes 4 and 5; as well as 6 and 7 which probe pairs are located diametrically opposite each other in the stator 1 as shown in FIG. 1. The pairs S3 and S4 may be connected in respective bridge circuit means.

As mentioned above, the two probes 4 and 5 or 6 and 7 forming a pair of probes are connected in series with each other in such a way that the magnetic field responsive elements $12_4$ and $12_5$ as well as $12_6$ and $12_7$ on the one hand form series connections while the ohmic resistance elements $13_4$ and $13_5$ as well as $13_6$ and $13_7$ form respective series connections.

The bridge circuit means comprises four arms A, B, C, and D, each of which includes one of said series connections of probe elements. The bridge circuit means further comprises monitor signal output terminals 19 and 21 as well as power supply terminals 20 and 22. The serially connected magnetically sensitive elements $12_4$ and $12_5$ of the probes 4 and 5 are located between the terminals 19 and 20 thus forming branch A of the bridge circuit means. The serially connected ohmic resistance elements $13_7$ and $13_6$ of the probes 7 and 6 respectively, are connected between the terminals 20 and 21 thus forming branch C. The serially connected ohmic resistance elements $13_5$ and $13_4$ of the probes 5 and 4 respectively, are connected between the terminals 21 and 22 thus forming branch D. The magnetically sensitive elements $12_6$ and $12_7$ of the probes 6 and 7 respectively, are connected between the terminals 22 and 19 thus forming branch B.

The bridge terminals 19 and 21 which provide the air gap monitoring signal are connected to indicating means comprising, for example, a peak voltage rectifier means 24 and a meter 25 connected to the rectifier 24 to indicate an unbalance of the bridge. The meter 25 is so calibrated in units of length that its readings correspond directly to the magnitude of the air gap to be monitored. The peak voltage rectifier means 24 is also connected to the input of a monitoring or control device 26, which is arranged to operate an alarm means when the bridge imbalance corresponding to the instantaneous magnitude of the air gap, exceeds a value which may be predetermined by adjusting a reference voltage in a comparator of said monitoring device which is thus threshold responsive.

Figure 4:
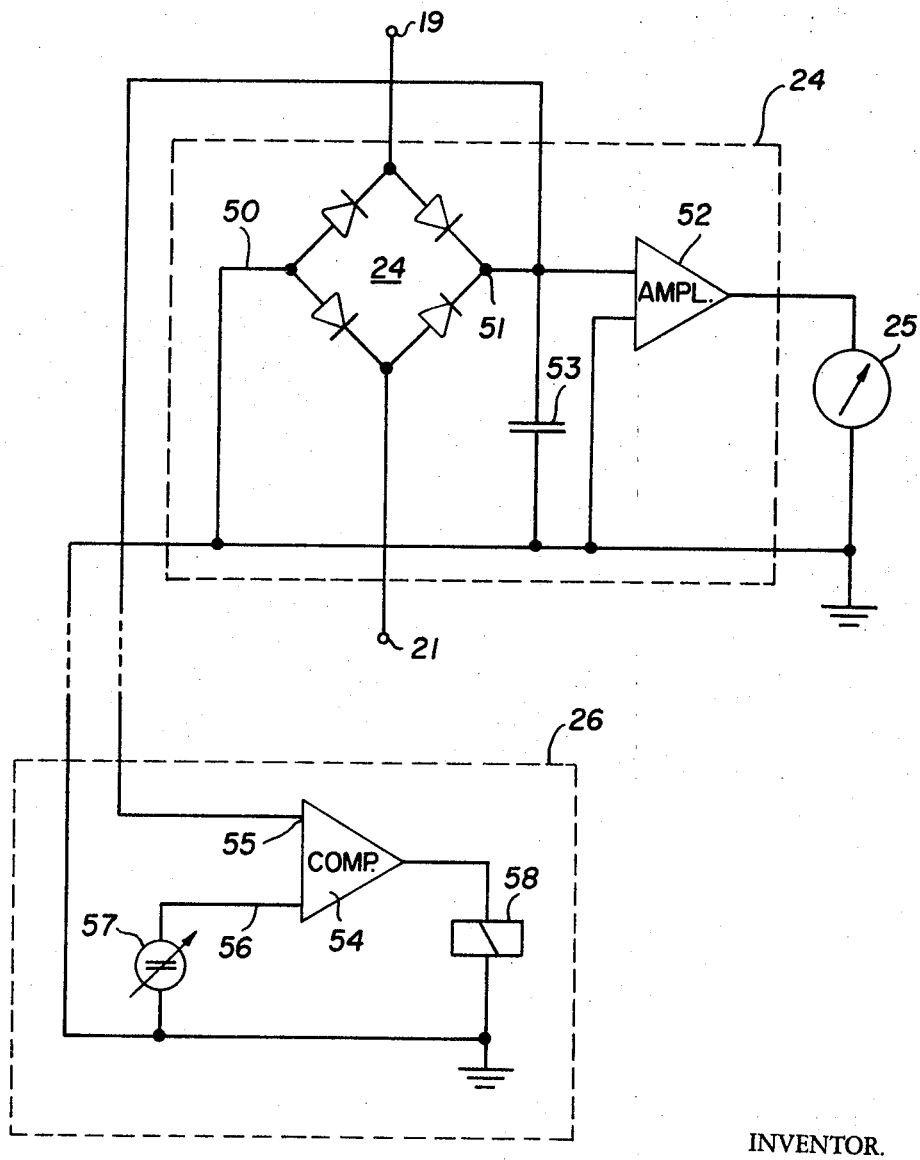
FIG. 4 illustrates details of the block diagram of FIG. 3.

Although the peak voltage rectifier means 24, the meter or indicating meter 25 and the monitoring device 26 are as such well known in the art; reference is now made to FIG. 4 illustrating details of the use of said devices in connection with the present invention. The output terminals 50 and 51 of the peak voltage rectifier 24' are connected, preferably through a separating amplifier 52, to the indicating meter 25. The capacitor 53 serves as a voltage source and is not subjected to the load of the current flowing through the indicating meter provided the amplifier 52 has a sufficiently high input impedance, whereby an accurate measuring of the air gap width is assured.

It is possible to combine the indicating instrument 25, such as a galvanometer, with means for triggering an alarm device. Such meters are known comprising contact means which close a circuit, for example for an alarm relay, when the pointer of the meter reaches a respective excursion. These contact means may be adjustable in their position along the pointer path, whereby the alarm will be given in response to the pointer reaching the threshold value which is determined by the adjusted position of the contact means. In this example, the meter 25 would simultaneously operate as an indicator and as an alarm triggering device.

However, if desired, it is also or in the alternative possible to employ a separate alarm device 26 as shown in FIG. 4. A so called comparator 54, as such well known in the art, is connected with one input terminal 55 to terminal 51 of the peak voltage rectifier 24'. Another input 56 of the comparator 54 is connected to a variable threshold voltage source 57. The output of the comparator 54 is connected to an alarm means, for example a relay 58. If the monitoring signal supplied to the input terminal 55 exceeds the threshold voltage at the other comparator input 56, a control signal will be provided at the output of the comparator 54 for energizing the relay 58. Since the comparator 54 has a high input impedance it is not necessary to use a separate amplifier between the rectifier and the comparator.

Incidentally, with respect to FIG. 3, it will be noted that a power supply, for example a battery 23, is connected between terminals 20 and 22.

Although specific example embodiments have been described, it is to be understood that the invention comprises all modifications and equivalents within the scope of the appended claims. For example, a plurality of bridge circuit means may be employed.

What I claim is:

1. In an apparatus for monitoring an air gap by means of magnetically responsive temperature compensated probes, especially in rotary electrical machines having a rotor and a stator defining said air gap therebetween to normally have a predetermined width, said stator including teeth facing said air gap and distributed about the stator in accordance with a given pole pitch, the improvement comprising at least four magnetic field responsive probes forming two pairs of adjacent probes located in said stator teeth immediately adjacent to said air gap so that adjacent probes forming a pair are spaced from each other by one pole pitch at the most, one pair of probes being arranged diametrically opposite the other pair of probes, each of said four magnetic field responsive probes comprising at least one magnetic field plate having a magnetic field responsive impedance and at least one further probe element having an ohmic, temperature responsive resistance, a bridge circuit having first (A), second (B), third (C), and fourth (D) branches, conductor means for interconnecting said branches to form power input terminals (20, 22) between the first and third branch, and between the second and fourth branch, as well as output terminals (19, 21) between the first and second branch and between the third and fourth branch, power supply means connected to said power supply terminals, and signal evaluating means connected to said output terminals for evaluating said monitoring signals which indicate the width of said air gap, further conductor means connecting in series with each other the magnetic field responsive field plates of adjacent probes of each pair, and further conductor means connecting in series with each other the ohmic, temperature responsive probe elements of adjacent probes of each pair, whereby each series connection of adjacent probe elements extends over one pole pitch at the most, and means connecting each series connection of field plates and series connection of ohmic elements ($12_6$, $12_7$, and $13_6$, $13_7$; $12_4$, $12_5$ and $13_4$, $13_5$) of adjacent probes of each pair in diagonally opposite bridge circuit branches, whereby a mean gap monitoring magnetic field value is ascertained over the respective pole pitch.

2. The apparatus according to claim 1, wherein said ohmic, temperature responsive resistance probe element has a temperature coefficient corresponding in magnitude to the respective coefficient of the magnetic field plate, and wherein said temperature coefficients have opposite sense.

3. The apparatus according to claim 1, wherein said signal evaluating means comprise a peak voltage rectifier having two input terminals and output means, said two rectifier input terminals being connected to said bridge output terminals (19, 21).

4. The apparatus according to claim 3, wherein said signal evaluating means comprise, in addition to said peak voltage rectifier, an indicating means connected to said output means of said peak voltage rectifier.

5. The apparatus according to claim 3, wherein said signal evaluating means further comprise threshold signal responsive means having a senstivity which is adjustable for responding to different threshold values, and means for connecting the threshold signal responsive means to the rectifier output means, whereby monitoring signals representing a predetermined air gap deviation from said given width are ascertained by triggering said threshold responsive means.

6. The apparatus according to claim 1, wherein the maximum number of series connected magnetic field responsive probes corresponds to the number of grooves per pole pitch in said electrical machine.

7. The apparatus according to claim 1, wherein said magnetic field responsive impedance probe element is a magnetic diode.

8. The apparatus according to claim 1, wherein said magnetic field responsive impedance probe element and said temperature responsive ohmic resistance probe element in each of said magnetic field responsive probes are electrically insulated from each other.

9. The apparatus according to claim 1, wherein said ohmic, temperature responsive resistance probe element is arranged in close thermal contact with the magnetic field responsive impedance element.

10. The apparatus according to claim 1, further comprising electrically insulating encapsulating means in which two probe elements forming a pair are embedded.

* * * * *